United States Patent [19]
Laney

[11] Patent Number: 5,987,805
[45] Date of Patent: *Nov. 23, 1999

[54] RISING FISHING DEVICE

[76] Inventor: Scot H. Laney, 3545 NW. 123rd Pl., Portland, Oreg. 97229

[*] Notice: This patent is subject to a terminal disclaimer.

[21] Appl. No.: 09/032,593

[22] Filed: Feb. 27, 1998

[51] Int. Cl.$^6$ ..................................................... A01K 95/00
[52] U.S. Cl. ........................ 43/42.13; 43/42.37; 43/43.13
[58] Field of Search ................................ 43/42.13, 42.37

[56] References Cited

U.S. PATENT DOCUMENTS

| | | |
|---|---|---|
| D. 153,798 | 5/1949 | Hinkson . |
| D. 327,939 | 7/1992 | Stecher . |
| D. 375,539 | 11/1996 | Chu . |
| D. 388,496 | 12/1997 | Reiger . |
| 1,644,151 | 10/1927 | Rodgers . |
| 1,801,940 | 4/1931 | Stanley . |
| 1,963,380 | 6/1934 | Peters et al. . |
| 2,241,767 | 5/1941 | Cullerton . |
| 2,295,765 | 9/1942 | Weber . |
| 2,567,180 | 9/1951 | Bunkowski . |
| 2,605,577 | 8/1952 | Waugler . |
| 2,788,605 | 4/1957 | Rediess et al. . |
| 2,986,838 | 6/1961 | Smyser . |
| 4,138,792 | 2/1979 | Hill . |
| 4,141,171 | 2/1979 | Muddiman . |
| 4,164,826 | 8/1979 | Metzler et al. . |
| 4,177,597 | 12/1979 | Thomassin . |
| 4,201,008 | 5/1980 | Sparkman . |
| 4,253,263 | 3/1981 | Franklin et al. . |
| 4,750,291 | 6/1988 | Chilton . |
| 4,783,928 | 11/1988 | Weaver . |
| 4,793,089 | 12/1988 | Long et al. . |
| 4,796,378 | 1/1989 | Krueger et al. . |
| 4,827,660 | 5/1989 | Dudeck . |
| 4,837,966 | 6/1989 | Bethel . |
| 4,845,883 | 7/1989 | Langer . |
| 4,862,629 | 9/1989 | Ryan . |
| 4,891,901 | 1/1990 | Baker, Jr. . |
| 4,916,854 | 4/1990 | Martin . |
| 4,932,153 | 6/1990 | Paluzzi . |
| 4,947,574 | 8/1990 | Tapley . |
| 4,962,610 | 10/1990 | Bleam et al. . |
| 4,998,373 | 3/1991 | Braswell . |
| 5,007,195 | 4/1991 | Patterson . |
| 5,018,297 | 5/1991 | Kennedy, Jr. . |
| 5,090,151 | 2/1992 | Salminen . |
| 5,094,026 | 3/1992 | Correll et al. . |
| 5,117,573 | 6/1992 | Semler . |
| 5,117,574 | 6/1992 | Perry . |
| 5,133,146 | 7/1992 | Stecher . |
| 5,136,801 | 8/1992 | Pond . |
| 5,182,876 | 2/1993 | Lewis . |
| 5,199,209 | 4/1993 | Cook . |
| 5,216,830 | 6/1993 | Brott, II . |
| 5,251,395 | 10/1993 | Wicklund . |
| 5,271,177 | 12/1993 | Cook . |
| 5,305,543 | 4/1994 | Fore . |
| 5,353,540 | 10/1994 | Ward . |
| 5,428,917 | 7/1995 | Cunningham . |
| 5,465,523 | 11/1995 | Garst . |
| 5,490,347 | 2/1996 | Conley . |
| 5,497,581 | 3/1996 | Williams . |
| 5,605,004 | 2/1997 | Boullt et al. . |
| 5,625,975 | 5/1997 | Imes . |

Primary Examiner—Peter M. Poon
Assistant Examiner—Francis T. Palo
Attorney, Agent, or Firm—Kolisch, Hartwell, Dickinson, McCormack & Heuser

[57] ABSTRACT

A rising fishing device is disclosed that includes a rise-inducing structure that includes an elongate body and a pair of wings extending from the body to define a wing plane that is disposed at an angle with respect to the body to create hydrodynamic lift when drawn through a body of water. The device preferably further includes a hook assembly extending rearward of the body at a defined angle with respect to the wing plane, and a coupling that extends forward of body and is adapted to be joined to a length of fishing line. In another embodiment, the invented rising fishing device is adapted to be what may be referred to as "buzz bait," in that it includes a frame with a first branch that is joined to the rise-inducing structure described above and a second branch spaced-apart from the first branch on which a spinner or propeller structure is rotatably mounted.

32 Claims, 4 Drawing Sheets

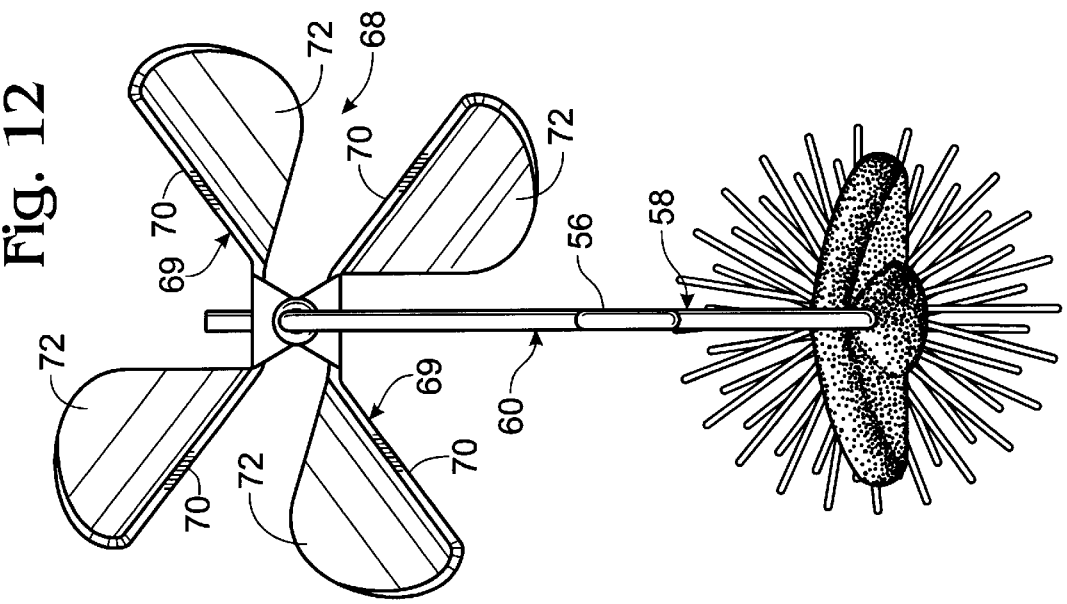
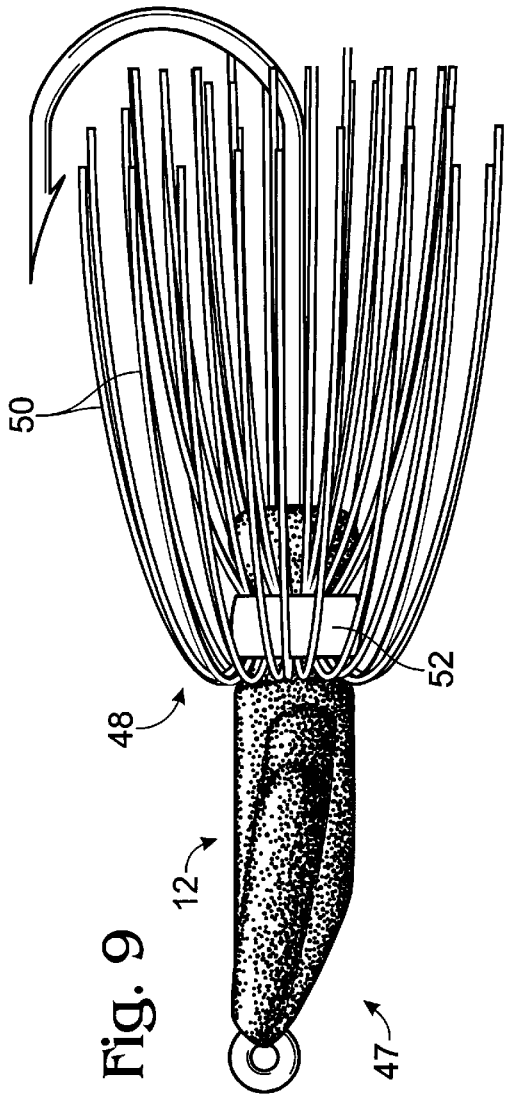
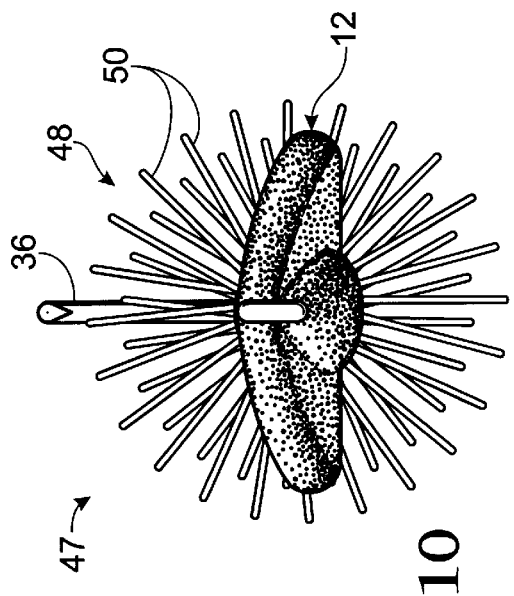

RISING FISHING DEVICE

BACKGROUND AND SUMMARY OF THE INVENTION

The present invention relates generally to fishing devices. More particularly, the invention concerns a novel fishing lure or weight that is adapted to generate hydrodynamic lift when drawn through a body of water.

In many fishing applications, it is desirable to have a fishing lure or weight that is designed to rise when drawn through a body of water. For example, one use of such a device is as a fishing weight. Because the weight rises toward the surface of the body of water when reeled in by the user, it (and any adjacent hook structure) is much less likely to become snagged or otherwise caught upon objects beneath the surface of the water, such as rocks, reeds, fallen trees, etc.

Another use of such a device is in spin-casting and related applications, where a lure is cast a desired distance away from the user and then immediately reeled in, in attempts to have a fish strike the moving lure as it is drawn across or near the surface of the water. In such applications, it is necessary for the lure to have sufficient weight to be able to cast a desired distance away from the user, but the weight also should be light enough to remain near the surface of the water as it is reeled in.

It should be understood that these are generally competing interests. For example, as weight is added to a lure, it is able to be cast further away from the user, but also is more likely to sink as it is reeled in. On the other hand, as weight is removed from the lure, it is less likely to sink as it is reeled in, however, it also tends to be more difficult to cast a desired distance away from the user. These competing demands are even harder to meet when the user wants to slowly reel in or retrieve the lure.

Examples of rising fishing weights are shown in U.S. Pat. Nos. 2,605,577 and 2,986,838 to Waugler and Smyser, respectively; the disclosures of which are hereby incorporated by reference. Both Waugler and Smyser disclose fishing weights having at least one pair of wings extending from an elongate body with a bore extending along the long axis thereof. A length of fishing line is passed through the bore, where it is connected to a fishing hook rearward of the weight and a rod and reel assembly forward of the weight. In all embodiments disclosed, the hook and weight are free to pivot, twist and otherwise bend or move with respect to each other. Furthermore, both Waugler and Smyser require a counterbore at the rearward portion of the weight into which a counterweight must be added to maintain the wings in their proper operating orientation when the weight is used in a body of water.

Both of these patents generally address the problem of developing a weight that rises in a body of water when drawn through the water, however, neither provide a particularly effective solution to the problem. Both include a hook assembly that is pivotal with respect to the weight, and therefore which causes instability to the path of the weight as it is drawn through a body of water. This defeats the rising fiction of the weight because the instability or imbalance of the weight and adjacent lure, hook, bait, etc. causes the weight to tip or turn in the water. Because the weight is biased to move in the water in the direction that the weight's top surface faces, it will move sideways or even downward, depending on the current orientation of the weight with respect to the top surface of the water.

Furthermore, both weights require the use of a counterweight to maintain the device in a proper operative position, and without such counterweight would not operate as intended. Adding a separately manufactured counterweight increases the time and labor, and thus expense, to manufacture the weight. Furthermore, the separate counterweight also increases the time and effort for a user to attach the weight and counterweight to a fishing line. It is understood, of course, that the longer it takes to get ready to fish, the less time the user can actually be fishing.

Briefly stated, the invented fishing device provides a novel rising fishing device that is not hindered by the drawbacks of prior rising fishing devices. The device includes a rise-inducing structure that includes an elongate body and a pair of wings extending from the body to define a wing plane that is disposed at an angle with respect to the body to create hydrodynamic lift when drawn through a body of water. The device preferably further includes a hook assembly extending rearward of the body at a defined angle with respect to the wing plane, and a coupling that extends forward of body and is adapted to be joined to a length of fishing line. In another embodiment, the invented rising fishing device is adapted to be what may be referred to as "buzz bait," in that it includes a frame with a first branch that is joined to the rise-inducing structure described above and a second branch spaced-apart from the first branch on which a spinner-or propeller-structure is rotatably mounted.

Other features and embodiments of the present invention will become more fully apparent as the following detailed description is read with reference to the below-described drawings.

BRIEF DESCRIPTION OF THE DRAWINGS

FIG. 9 is a side elevation view of another alternate embodiment of the device shown in FIG. 1.

FIG. 10 is a front elevation view of the device of FIG. 9.

FIG. 12 is a front elevation view of the device of FIG. 11.

DETAILED DESCRIPTION OF THE PREFERRED EMBODIMENTS

Figure 1:
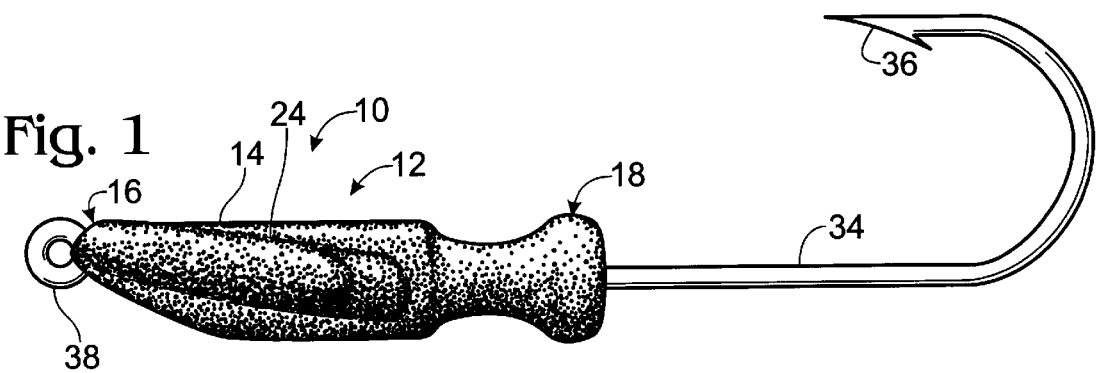
FIG. 1 is a side elevation view of a rising fishing device constructed in accordance with a first embodiment of the present invention.

A rising fishing device constructed according to a preferred embodiment of the present invention is shown in FIGS. 1–6 and generally indicated at 10. Device 10 includes a rise-inducing structure, or member, 12, which generates hydrodynamic lift as the device is drawn through a body of water, or alternatively, as flowing water passes over the device. Member 12 includes an elongate body 14 with a front region 16 and a tail region 18. As shown, tail region 18 has a generally cylindrical cross-sectional configuration and includes a neck portion 20 and an end portion 22 with a wider diameter than the neck portion. As discussed subsequently, neck portion 20 provides a mount upon which a skirt may be secured and retained on device 10 by the wider end portion 22.

Member 12 further includes a pair of wings 24 that extend from body 14 to define a wing plane 26 with a top surface 28 and a positive angle of attack with respect to the long axis of body 14. Perhaps best seen in FIGS. 1—3, wings 24 extend generally outwardly and downwardly from front region of body 14 as they extend rearward along the body to a terminal position generally between front region 16 and tail region 18. Each wing 24 includes a forward edge 30 that extends away from front region 16 at an angle of approximately 35° with respect to a line transverse to the long axis of body 14. Preferably, this angle is within the range of approximately 5° to approximately 65°, more preferably within the range of approximately 20° to approximately 55°, and even more preferably within the range of approximately 30° to approximately 40°.

Forward edges 30 are preferably arcuate and approach a generally parallel orientation with respect to body 14 as they extend rearwardly from front region 16. Edges 30 join a corresponding pair of rearward edges 32 and return to body 14 generally between the front and tail regions of body 14. By generally between, it is meant that rearward edges 32 do not necessary meet the body at the midpoint between the front and tail regions of the device. Instead, it should be understood that the size or surface area of the wings may vary, depending for example on the amount of lift needed, the weight of device 10, and the weight of any additional attachments secured to or near device 10. As shown, rearward edges 32 join body 14 within the region bounded by the tail region and the midpoint between the tail and front regions.

Perhaps best seen in FIG. 1, wings 24, and thus wing plane 26, extend at an angle with respect to the long axis of body 14. As shown, wing plane 26 extends downward from above the long axis of body 14 at an angle of approximately 12° with respect to the long axis of body 14. This angle too may vary, but generally should be in the range of approximately 5° to approximately 40°, preferably in the range of approximately 5° to approximately 25°, and more preferably in the range of approximately 10° to approximately 20°. Furthermore, wing plane 26 may originate on or slightly below the long axis of body 14 without departing from the spirit and scope of the present invention, so long as it is downwardly inclined as it extends rearwardly from front region 16.

Figure 2:
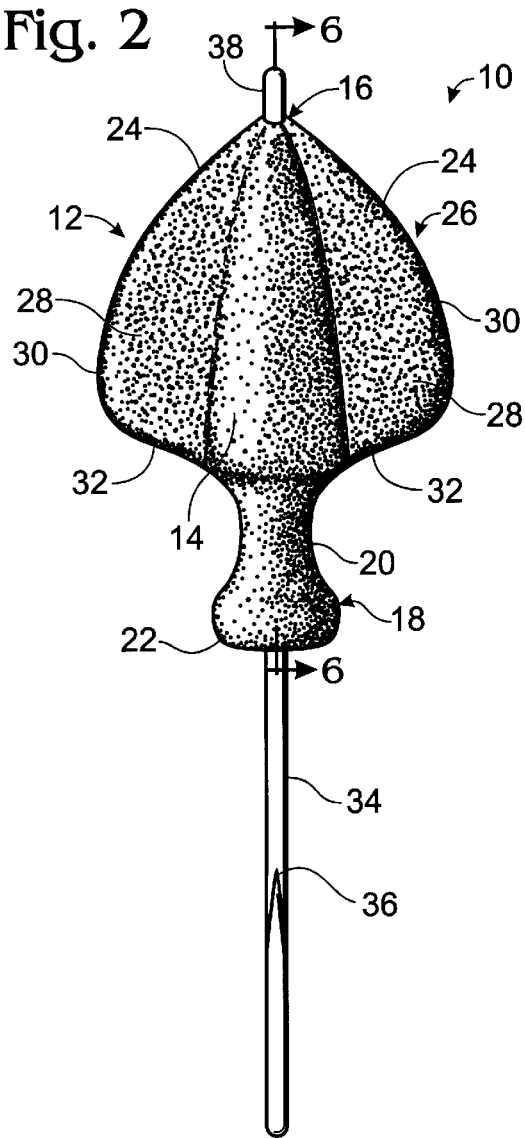
FIG. 2 is a top plan view thereof.
Figure 3:
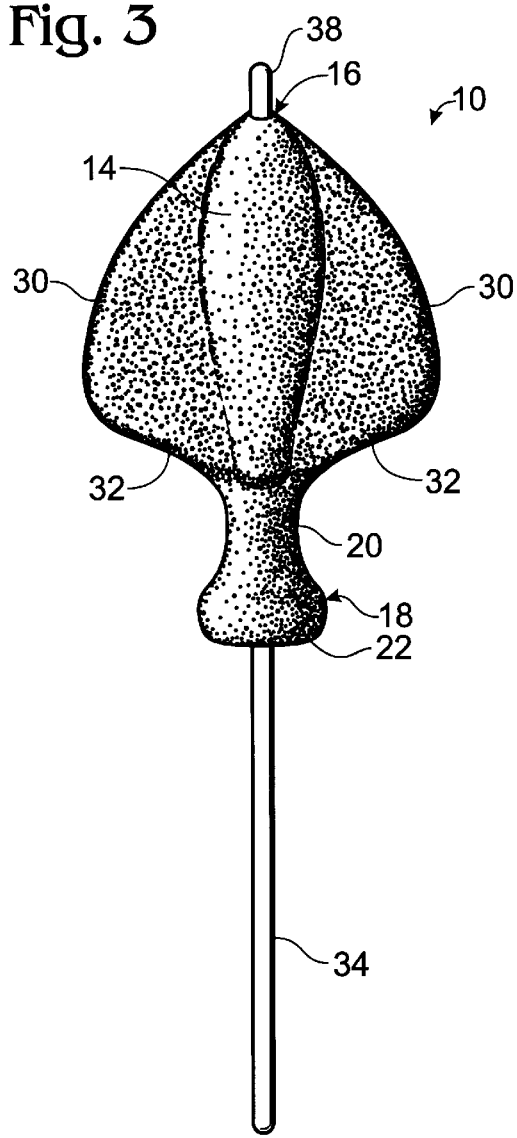
FIG. 3 is a bottom plan view thereof.
Figure 4:
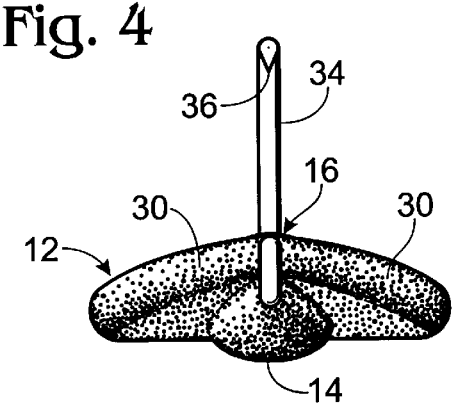
FIG. 4 is a front elevation view thereof.
Figure 5:
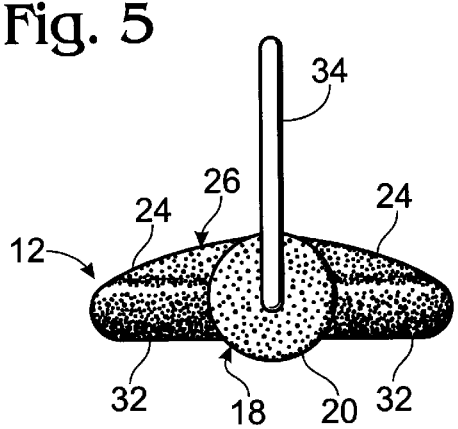
FIG. 5 is a rear elevation view thereof

As shown in FIGS. 1–3, device 10 further includes a hook assembly 34 that extends rearward from tail region 18 of the body generally along the longitudinal axis thereof Assembly 34 is maintained in a defined, or fixed, orientation with respect to device 10, and more specifically, wing plane 26. This configuration is preferred because hook 34 and any bait or lure attached thereto does not pivot or sway about its point of attachment to device 10 as the device is drawn through water. This enables device 10 to maintain a stable orientation in which top surface 28 of wing plane 26 is generally oriented toward the surface of the body of water. If the hook and any attached bait or lure were allowed to pivot or move with respect to the wing plane, it would unbalance device 10, and tend to cause the device to tip or rotate about its long axis, thereby defeating the purpose of the rise-inducing member.

As shown, hook assembly 34 includes a single hook with a barb 36 oriented above rise-inducing member 12. It should be understood that hook assembly 34 may include a plurality of hooks oriented in the same or different orientations with respect to each other and member 12. Regardless of the number of hooks, it is still preferred that they extend at a defined, nonpivoting, orientation with respect to wing plane 24 to promote the stability of device 10 as it is drawn through water.

Device 10 further includes a coupling 38 that extends forward from front region 16 and is adapted to receive or be connected to a length of fishing line (not shown). It should be understood that fishing line may be directly connected to coupling 38, or alternatively, may be connected to coupling 38 via a series of leaders, swivels, additional weights, etc. so long as ultimately the line and coupling 38 are joined. As shown, coupling 38 includes a loop and extends generally forward and upward from front region 16. The precise position and orientation of coupling 38 with respect to device 10 may vary, but it is preferably on or adjacent front region 16.

Coupling 38 and hook assembly 34 may be independent members that are separately connected to member 12. Therefore, member 12 may be initially formed, and then coupling 38 and hook assembly 34 may be subsequently secured to it. When a molding process is used to make member 12, coupling 38 and hook assembly 34 may be secured to member 12 by inserting a respective portions of the coupling and assembly into member 12 before it is cured. In fact, when formed through this process, member 12 may serve as the binder that joins coupling 38 and hook assembly 34 and maintains them in a desired position with respect to each other. Furthermore, this method does not require the additional time and labor to secure the coupling and hook assembly to member 12 once it is formed.

Figure 6:
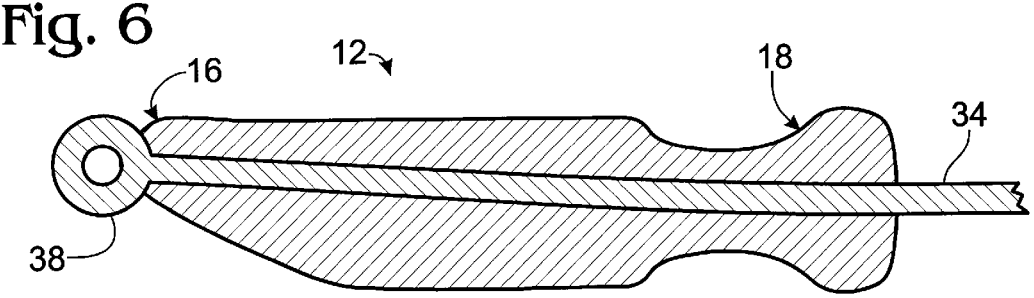
FIG. 6 is a cross-sectional view taken along the line 6—6 in FIG. 2 and showing an alternate embodiment of the rising fishing device of FIG. 1.

An alternate embodiment of device 10 is shown in cross-section in FIG. 6. In this embodiment, hook assembly 34 and coupling 38 are formed as a one-piece, integral unit. As shown, the hook assembly 34 extends through member 12, generally along the long axis of body 14 from tail region 18 to front region 16, where it forms coupling 38. An advantage of this embodiment is that both the coupling and the hook assembly may be positioned within the unit in a single step, especially during the molding process which may be used to form member 12. Furthermore, with member 12 molded and cured at least partially around the shaft of assembly 34, a much stronger bond is formed between rise-inducing member 12, hook assembly 34 and coupling 38. It should be understood that unless otherwise indicated, each of the embodiments disclosed herein have the same components and subcomponents.

The body and wings of device 10 may be formed of any suitable structural material, including suitable metallic, resin and/or composite materials. Preferably, they are formed from a curable material that enables the body and wings, and therefore dive-inducing member 12, to be molded or otherwise formed together as an integral, one-piece unit.

With respect to the preferred composite material for making the body and wings of device 10, certain chemical and physical features of that material will be described. In addition to the present disclosure, applicant also incorporates by reference the subject disclosed in his U.S. patent Ser. No. 5,824,728 dated Oct. 20, 1998 entitled Iron-Ferrite-Filled Polymer-Based Composite Material and Method of Making The Same.

The composite material is a curable, polymer-based composite material consisting essentially of a first volume of a curable polymeric component, and a second volume of iron ferrite particles. The polymeric component preferably includes a styrene butadiene resin (SBR). Example formulations will be described below. An example of a relative volume ratio is 100 parts polymeric component to 3,000 parts iron ferrite particles, and a method of forming the composite material will also be described. The relative volume ratio may vary depending on the application but, from the example, it should be clear that extremely high loading levels are possible using the to-be-described method of the invention.

Figure 7:
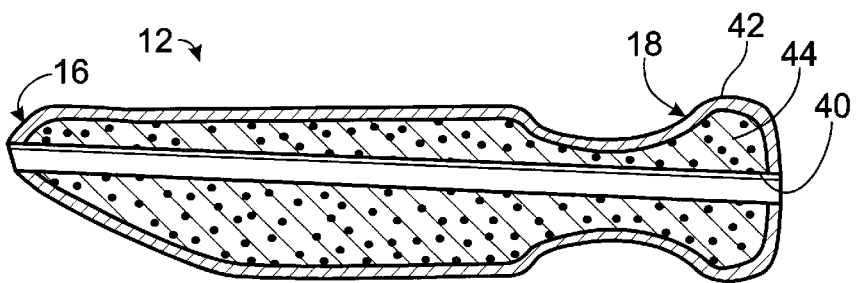
FIG. 7 is the cross-sectional view of FIG. 6 showing another alternate embodiment of the device shown in FIG. 1.

Because of its high density, the composite material is usable as a lead substitute. The composite material is also moldable using conventional methods. The composite material is also magnetizable and millable after it is molded into a desired shape. Referring to FIG. 7, rise-inducing member 12 of device 10 is made of the composite material and may also be surface-coated with paint or other desired, suitable coating. Preferably, the member made from the composite material has a specific gravity in the range of approximately 7.5 to approximately 8.0.

To form the polymer-based, and preferably rubber-based, composite material of the invention, the following method is performed. First, the method includes selecting a first amount of curable rubber-based resin, and selecting an amount of filler. Preferably, the rubber-based resin includes an SBR resin, and the filler is iron ferrite particles.

The method also includes the steps of reserving a fraction of the curable rubber-based resin from the first amount, and mixing the unreserved portion of the first amount of the curable rubber-based resin with the amount of filler. Next, the method includes adding the reserved second amount of the curable rubber-based resin to the mixture, and repeating the mixing step.

The reserving step may involve reserving plural fractions of the first amount of the curable rubber resin and, for such a case, the method will further include the step of performing the adding and repeating steps for each fraction.

Preferably, the reserving step includes cooling the reserved fraction of the first amount of the curable rubber resin. Generally speaking, the cooling can be accomplished by reserving because the resin is warmed to a processing temperature in the mill. Where there are plural reserved fractions, each reserved fraction is cooled.

EXAMPLE I

| Parts | Material |
| --- | --- |
| 110 | SBR 1712 |
| 20 | SBR 1009 |
| 5 | ZINC OXIDE |
| 2 | STERIC ACID POWDERED CURING AGENT |
| 1.5 | NAUGARD Q ANTI-OXIDANT |
| 3000 | IRON FERRITE POWDER |
| 20 | NEBONY 100 DESSICANT |
| 40 | CALIFLUX SP PLASTICIZER |
| 2.5 | SULFUR CURING AGENT |
| 1.5 | MBTS CURE ACCELERATOR |
| .35 | CUMATE CURE-CONTROLLING AGENT |

The above example produces a product with a specific gravity of about 7.5–8.0, and could be used for applications such as the fishing devices described herein or the first layer of a sound dampening system. The relative parts of each component are by volume. The processing temperature may vary as required by batch size. For production batches of about 900–950 pounds, the preferred processing temperature is between about 200–250° F. The above components are commercially available, and preferably the SBR resins are from Polysar, the zinc oxide from Azon, the Naugard Q anti-oxidant, Nebony 100 plasticizer and MBTS (2-mercaptobenzothiazyl disulfide) cure-controlling agent all from Harwick, the iron ferrite from Western Supply, and the Califlux SP plasticizer from H. M. Royal.

Numerous variations are possible with respect to blending of SBR resins, or choosing other suitable resins. With respect to Example I, the SBR 1712 resin is of the master-batch type so that there is about 80 parts SBR and about 30 parts oil. The result is that Example I requires the usual 100 parts SBR.

With respect to the iron ferrite powder, any suitable particle size is acceptable, and 90 mesh (ASTM) has been found suitable.

Production batches of Example I can be made using a suitable mill or rotary mixer such as a Banbury mixer. The sequence of adding components may vary, but the cure-related components, particularly the sulfur and MBTS should be added last. Where practical, best results are obtained by pre-mixing the SBR 1712 and 1009 resins, reserving a fraction of about 30–50% of the pre-mixed resins, and then adding materials in the following sequence: (1) joint addition of zinc oxide, steric acid powder, and Naugard Q anti-oxidant, (2) joint addition of iron ferrite powder, Nebony 100 plasticizer, cumate cure-controlling agent, and Califlux SP plasticizer, (3) addition of the reserved fraction of pre-mixed SBR resins, and (4) joint addition of sulfur curing agent and MBTS cure accelerator.

By reserving the fraction of pre-mixed SBR resins, that fraction will drop in temperature substantially from the processing temperature, and temperature drops of about 50–100° F. are possible. Reintroducing that fraction after addition of the iron ferrite powder has been found to be effective in allowing the resins to be loaded with such a high percentage of iron ferrite powder as in Example I.

When made with a production mill, Example I requires about 45-minutes for adequate mixing. When made with a rotary mixer such as a Banbury mixer, Example I requires about 5-minutes for adequate mixing. When mixing is complete, the material will have a sheet-like appearance (mill mix) or a crumb-like appearance (Banbury mixer). When mixed using a Banbury mixer, the material is preferably dispensed from that mixer into a mill to produce a sheet-like form.

With respect to curing and molding of the composite material into desired shapes such as rise-inducing member 12, any suitable rubber curing/molding techniques can be used. The preferred cure temperature is about 325° F.

An important change to the conventional curing method is that the composite material is substantially undercured. For example, when a 2.5-inch diameter puck-like object is formed using the composite material, it should be cured for about 12 minutes at 325° F. That cure time will produce a desired central, substantially uncured section of the composite material, and a first outer, substantially cured section. The substantially cured section may also be thought of as a skin section. In general, the composite material is preferably undercured by curing it only for approximately 20–30% of the usual required time at the required temperature. Even though the composite material is undercured, it has been surprisingly effective for use in the applications described above.

EXAMPLE II

| Parts | Material |
|---|---|
| 110 | SBR 1712 |
| 20 | SBR 1009 |
| 5 | ZINC OXIDE |
| 2 | STERIC ACID POWDERED CURING AGENT |
| 1.5 | NAUGARD Q ANTI-OXIDANT |
| 130 | IRON FERRITE POWDER |
| 20 | NEBONY 100 DESSICANT |
| 40 | CALIFLUX SP PLASTICIZER |
| 2.5 | SULFUR CURING AGENT |
| 1.5 | MBTS CURE ACCELERATOR |
| .35 | CUMATE CURE-CONTROLLING AGENT |

The above example produces a product with a specific gravity of about 1.5–2.0, and could be used for applications such as the hockey puck-like sports article. The processing temperature is again preferably about 200–250° F. The materials are the same as those described in connection with Example I. The only change relative to the two examples is that substantially less iron ferrite powder is used. The reserving step can be used for Example II but, due to the substantial drop in relative percentage of iron ferrite powder, there is less need to use that step to achieve adequate dispersion of the iron ferrite powder in the resin.

The composite material has a suitably high density for use as a substitute for lead. It also has a low-rebound characteristic and may be relatively inexpensively manufactured. The composite material is also moldable and, in its resulting molded form, it is magnetizable and millable.

In FIG. 7, an alternate embodiment of device 10 is shown in cross-section and formed from the above-described composite material. For purposes of illustration, the cured, outer portion of the material is schematically illustrated at 42, and the partially cured, or under cured, portion of the material is schematically illustrated at 44. It should be understood that this composite material of construction may be used for any of the embodiments disclosed herein. In the embodiment shown in FIG. 7, device 10 does not include the previously described hook assembly 34 and coupling 38. Instead, device 10 includes an elongate passage 40 that extends through device 10 from front region 16 to tail region 18. Passage 40 is sized to receive a length of fishing line (not shown), which may be threaded through the passage. It should be understood that the portion of the line the would extend forward of device 10 should be connected to a rod and reel assembly, and the portion of the line which would extend rearward of device 10 should be connected to a fish-catching device, such as hooks, lures, swivels, weights, leaders, bait, or other fishing paraphernalia and combinations thereof which are commonly attached to a fishing line to catch fish or other aquatic creatures.

Figure 8:
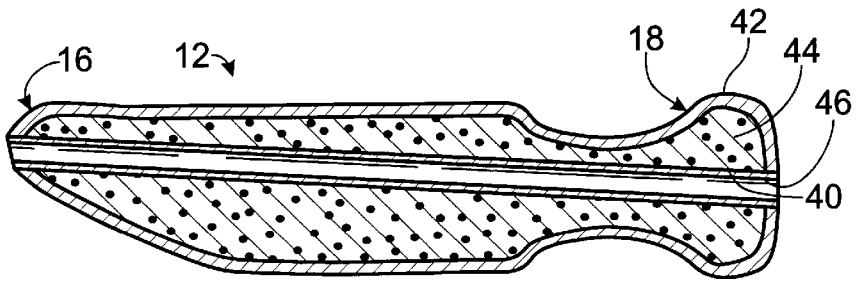
FIG. 8 is a cross-sectional view showing an another alternate embodiment of the device shown in FIG. 1.

A variation of this embodiment is shown in FIG. 8, in which a tube 46 extends along at least a substantial portion of the length of passage 40. Tube 46 protects the inside of passage 40 and provides a smoother surface along which the fishing line may extend, thereby preventing any fraying and therefore weakening of the line.

A further embodiment of device 10 is shown in FIGS. 9 and 10 and is indicated generally at 47. Device 47 includes any of the previously described embodiments and materials of construction, and further includes a skirt assembly 48 that extends around neck portion 20 of tail region 18. Skirt assembly 48 is formed from a plurality of strands 50 of a flexible, and preferably elastomeric, material. As shown, strands 50 are retained generally at their midregions on neck region 20 by a band 52 and extend forward and rearward of neck region 20. As device 47 is used, however, the strands will be swept back toward hook assembly 34, as schematically illustrated in FIGS. 9 and 10. It should be understood that the number and length of strands 50 may vary, depending upon the user's tastes and the distance hook assembly 34 extends rearward from tail region 18. When strands 50 are retained generally around their midregions, as shown, a fuller or bushier cluster is formed rearward of wing plane 26 to at least partially hide hook assembly 34. Strands may be retained at their ends on neck region 20, but doing so would reduce the volume of the strands as they extend rearward of wing plane 26. Strands 50 may be of similar or varied colors, and may further include reflective particles or other known fish attracting paraphernalia. Furthermore, skirt assembly 48 may be formed from artificial or real feathers instead of strands 50.

Figure 11:
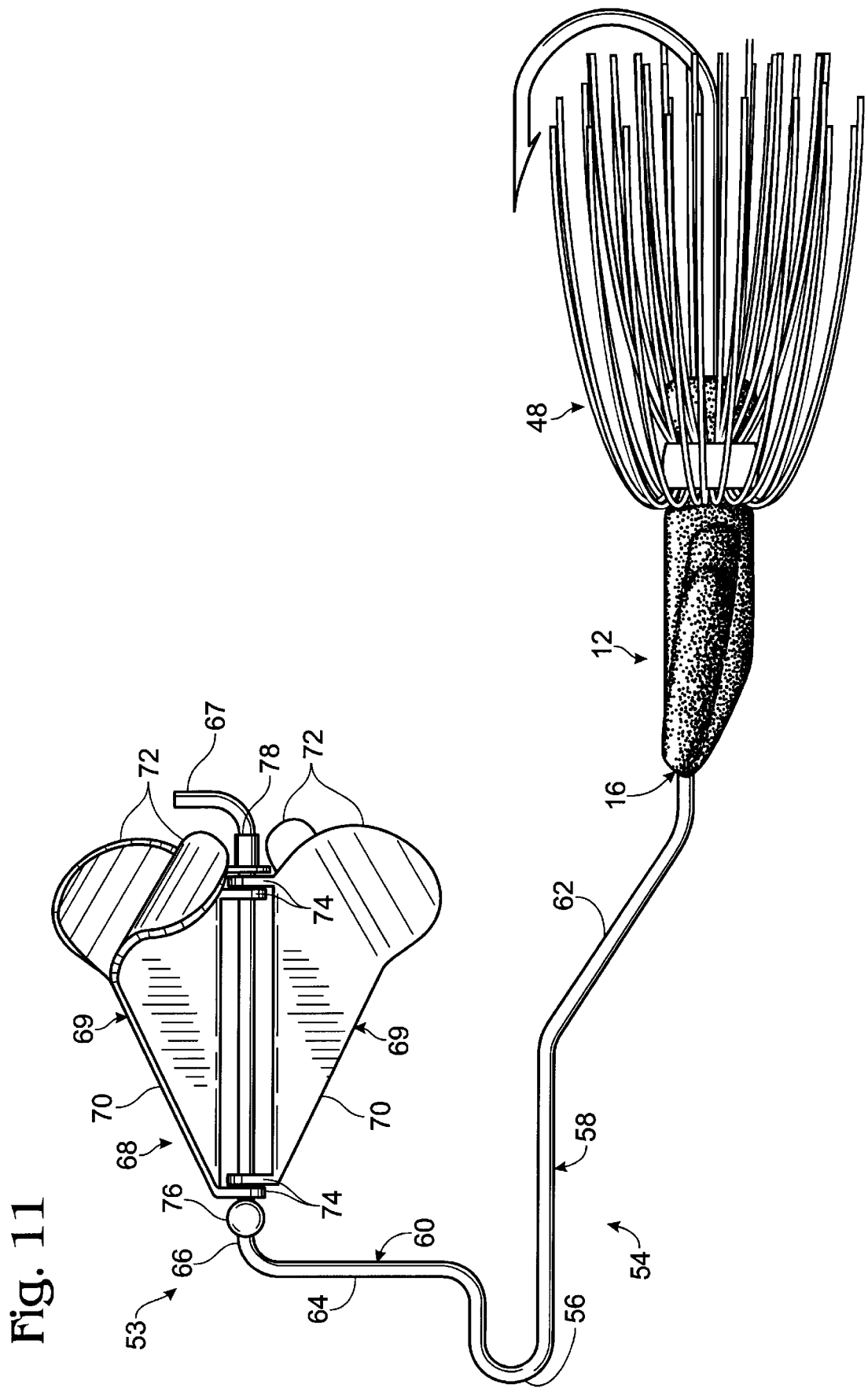
FIG. 11 is a side elevation view of another alternate embodiment of the rising fishing device shown in FIG. 1.

A further embodiment of the invented rising fishing device is shown in FIGS. 11 and 12 and indicated generally at 53. It should be understood that device 53 may include the components of any of the previously described embodiments. In this embodiment, the lure is adapted to be what is generally referred to a "buzz bait," because of the propeller-like spinners that spin and agitate the water to produce resonant effects that attract fish. Examples of other forms of buzz bait are shown in U.S. Pat. Nos. 5,605,004, 5,497,581, 5,251,395, 4,998,373, 4,962,610, 4,947,574, 4,891,901 and 4,793,089, the disclosures of which are hereby incorporated by reference.

As shown, device 53 includes a frame 54, which includes a coupling 56 and first and second branches 58 and 60, respectively. As shown, coupling, or line attachment structure, 56 includes a notch-like or u-shaped portion to which a fishing line may be attached. Alternatively, it may include the previously described loop or another known attachment device used in the fishing industry.

First branch 58 extends from coupling 56 and is connected to one of the embodiments of the previously described rise-inducing members 12. As shown, branch 58 includes an angled segment 62 which enables member 12 to extend generally parallel to the axis of the subsequently described spinner assembly, without lying directly within the wake of the spinner assembly.

Second branch 60 extends from line attachment structure 56 and includes a first leg 64 that extends generally transverse to the long axis of rise-inducing member 12, and a second leg 66 that extends rearwardly from first leg 64 and generally parallel to the long axis of rise-inducing member 12. Second leg 66 terminates with a transversely oriented end 67 that prevents objects slidably mounted on second leg 66 from being unintentionally removed. As shown, a spinner assembly 69 is rotatably mounted on second leg 66. It should be understood that the precise shape and orientation of branches 58 and 60 may vary, however, it is preferred that they are sufficiently spaced-apart from each other to maintain the long axes rise-inducing member 12 and spinner assembly 68 in an offset, but generally parallel, configuration.

Spinner assembly 68 includes one or more spinners 69, which as perhaps best seen in FIG. 12, each include a pair of radially offset blades 70 with laterally extending, or transversely bent, rearward tabs 72. As device 53 is drawn through a body of water, the force of the water against tabs 72 causes spinners 69 to rotate about their axis of rotation, namely, second leg 66. This creates drag in the water, which slows the retrieval of device 53 as it is reeled in. Furthermore, as spinners 69 rotate about leg 66, they will tend to strike each other, thereby creating audible noise and vibrations in the water that will attract fish to device 53.

Turning back to FIG. 11, it can be seen that each spinner 69 is rotatably retained on leg 66 by a pair of flange-like members 74, which include aligned holes through which leg 66 extends. Also shown in FIG. 11 is a spacer 76 disposed on second leg 66 between its intersection with first leg 64 and spinners 69, and a bearing 78 disposed on second leg 66 between spinners 69 and end 67.

Because rise-inducing member 12 is heavier than spinner assembly 68, which is typically constructed from aluminum or a similar material, member 12 will tend to remain lower in the water than spinner assembly 68 as device 53 is drawn through the water. The drag produced by assembly 68 will slow the retrieval of device 53, which would tend to cause the weight of member 12 to tip the entire device in the water, and cause it to sink. The hydrodynamic lift generated by member 12, however, prevents member 12 from sinking in the water, and instead maintains its generally horizontal orientation within the water. Because device 53 is essentially balanced, with member 12 weighted to remain lower than spinner assembly 68, and with hook assembly 36 fixed in a defined orientation with respect to wing plane 26 of rise-inducing member 12, device 53 will be drawn through a body of water in a controlled, stable path, instead of wildly spinning or tipping as a unit. By varying the weight of member 12, the angle of attack of the member's wing plane, and the angle of the axis of spinner assembly 69 and member 12's long axis, it is possible to control the angular orientation at which device 53 is drawn through the water.

Accordingly, while a preferred embodiment of the invention has been described herein, it is appreciated that modifications are possible that are within the scope of the invention.

I claim:

1. A fishing device, comprising:
   a frame having a line attachment structure and first and second branches extending rearwardly from the line attachment structure;
   a rise-inducing member mounted on the first branch, said rise-inducing member having a wing plane adapted to generate hydrodynamic lift when the device is drawn forward through a body of water, wherein the rise-inducing member is formed of a curable, polymer-based composite material consisting essentially of a first volume of a curable polymeric component mixed with a second volume of iron ferrite particles; and
   spinner structure rotatably mounted on the second branch and adapted to rotate about an axis extending through the second branch.

2. The device of claim 1, wherein the device further includes a hook assembly extending from the rise-inducing member.

3. The device of claim 2, wherein the hook assembly is fixed at a determined orientation with respect to the rise-inducing member.

4. The device of claim 1, wherein the wing plane has a positive angle of attack oriented generally toward the line attachment structure.

5. The device of claim 1, wherein the frame is a one-piece wire frame.

6. The device of claim 1, wherein the rise-inducing member further includes an elongate body extending along a portion of the first branch.

7. The device of claim 6, wherein the wing plane is oriented at an angle of approximately 5° to approximately 40° relative to the long axis of the body.

8. The device of claim 6, wherein the wing plane extends at an angle of approximately 5° to approximately 25° with respect to the long axis of the body.

9. The device of claim 6, wherein the wing plane extends at an angle of approximately 10° to approximately 20° with respect to the long axis of the body.

10. The device of claim 1, wherein the rise-inducing member has a specific gravity between approximately 7.5 and approximately 8.0.

11. The device of claim 1, wherein the member includes a central substantially uncured section and an outer substantially cured section.

12. The device of claim 1, wherein the polymeric component includes a styrene butadiene resin.

13. A fishing device, comprising:
    an elongate body having a front region, an upper surface and a tail region oriented generally toward a hook;
    a pair of wings extending at an angle from the body generally downwardly and rearwardly to define a wing plane adapted to create hydrodynamic lift when the device is drawn through a body of water, wherein the body and the wings are formed of a curable, polymer-based composite material consisting essentially of a first volume of a curable polymeric component mixed with a second volume of iron ferrite particles; and
    a hook assembly extending rearwardly from the tail region at a fixed orientation with respect to the wing plane.

14. The device of claim 13, wherein the device further includes a coupling extending from the front region and adapted to be connected to a length of fishing line.

15. The device of claim 14, wherein the coupling includes a loop extending at least partially from the front region.

16. The device of claim 14, wherein the coupling is formed in a one-piece, integral unit with the hook assembly.

17. The device of claim 13, wherein the wing plane is oriented at an angle of approximately 5° to approximately 40° relative to the long axis of the body.

18. The device of claim 13, wherein the wing plane extends at an angle of approximately 5° to approximately 25° with respect to the long axis of the body.

19. The device of claim 13, wherein the wing plane extends at an angle of approximately 10° to approximately 20° with respect to the long axis of the body.

20. The device of claim 13, wherein the body and the wings have a specific gravity between approximately 7.5 and approximately 8.0.

21. The device of claim 13, wherein the body and the wings include a central substantially uncured section and an outer substantially cured section.

22. The device of claim 13, wherein the polymeric component includes a styrene butadiene resin.

23. A fishing device, comprising:
    a rise-inducing member including an elongate body and a pair of wings extending from the body to define a wing plane adapted to generate hydrodynamic lift as the device is drawn forward through a body of water,
    wherein the member is formed from a curable, polymer-based composite material consisting essentially of a first volume of a curable polymeric component mixed with a second volume of iron ferrite particles, with the member including a central substantially uncured section and an outer substantially cured section.

24. The device of claim 23, wherein the polymeric component includes a styrene butadiene resin.

25. The device of claim 23, wherein the member has a specific gravity between approximately 7.5 and approximately 8.0.

26. The device of claim 23, wherein the device further includes a coupling adapted to be connected to a length of fishing line.

27. The device of claim 23, wherein the body includes an elongate passage extending along the length of the body.

28. The device of claim 23, wherein the body and the wings are formed as an integral, one-piece unit.

29. The device of claim 23, wherein the wing plane extends at an angle downwardly as it extends rearwardly along the body.

30. The device of claim 23, wherein the rise-inducing member includes a hook assembly extending therefrom.

31. The device of claim 30, wherein the hook assembly is fixed at a determined orientation with respect to the rise-inducing member.

32. The device of claim 23, further including a frame extending from the body and having a spinner structure rotatably mounted thereupon.

\* \* \* \* \*